(12) United States Patent
Okada et al.

(10) Patent No.: US 6,218,928 B1
(45) Date of Patent: *Apr. 17, 2001

(54) PTC THERMISTOR MATERIAL

(75) Inventors: Masuo Okada, 9-6, Yagiyamaminami 3-chome, Taihaku-ku, Sendai-shi, Miyagi; Takahiro Sawaguchi, Miyagi; Masatada Yodogawa, Tokyo, all of (JP); Dai Matsuoka, Arlington, MA (US)

(73) Assignees: TDK Corporation, Tokyo; Masuo Okada, Sendai, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,337
(22) PCT Filed: Sep. 12, 1997
(86) PCT No.: PCT/JP97/03227
§ 371 Date: May 8, 1998
§ 102(e) Date: May 8, 1998
(87) PCT Pub. No.: WO98/11568
PCT Pub. Date: Mar. 19, 1998

(30) Foreign Application Priority Data

Sep. 13, 1996 (JP) .................................................... 8-265547

(51) Int. Cl.$^7$ ..................................................... H01C 7/10
(52) U.S. Cl. .................................... 338/22 R; 338/225 D
(58) Field of Search .................................... 338/22 R, 25, 338/225 D, 308, 309, 225, 322, 328; 252/520, 521

(56) References Cited

U.S. PATENT DOCUMENTS 4,483,933 * 11/1984 Kobayashi et al. .................. 501/138
4,889,760 12/1989 Horst et al. .

FOREIGN PATENT DOCUMENTS

| 62-214601 | * 9/1987 | (JP) . |
| 6-163204 | 6/1994 | (JP) . |
| 6-283308 | 10/1994 | (JP) . |
| 7-161502 | 6/1995 | (JP) . |

OTHER PUBLICATIONS

Database WPI, Week 8743, Derwent Publications Ltd., London, GB; AN 1987–303839 XP002120569 & JP 62 214601 A (Tanaka Denshi Kogyo KK), Sep. 21, 1987 *abstract*.

* cited by examiner

Primary Examiner—Michael L. Gellner
Assistant Examiner—Richard K. Lee
(74) Attorney, Agent, or Firm—Oblon, Spivak, McClelland, Maier & Neustadt, P.C.

(57) ABSTRACT

The PTC thermistor material of the invention comprises a matrix phase and electrically conductive phases substantially uniformly dispersed in the matrix phase, said conductive phases having a resistivity lower than that of the matrix phase, and has a resistivity changing sharply in the vicinity of the melting point of the conductive phases. The matrix phase is made up of any one of a polycrystalline ceramic material, a glass-polycrystalline ceramic composite material, a glass, a crystallized glass, and a polymer material, and the conductive phases are made up of a metal containing bismuth as a main component. It is thus possible to achieve a PTC thermistor material which can be controlled in terms of various properties such as the temperature at which PTCR property becomes available and the rate of resistivity change and so can be applied to circuit parts through which large currents pass in a normal operation state. Further, the PTC thermistor material can be easily manufactured with the stable PTCR property maintained. Furthermore, the PTC thermistor material can be operated with an increased rated current albeit being of small size, and has a high degree of shape freedom.

9 Claims, 5 Drawing Sheets

PTC THERMISTOR MATERIAL

TECHNICAL FIELD

The present invention relates to a PTC thermistor material used for temperature control elements, etc.

BACKGROUND TECHNIQUES

Among recent non-structural materials under intensive investigation there is a thermistor. The thermistor is a circuit element with its resistivity changing largely with temperature.

The thermistor is broken down into two types, NTC thermistor and PTC thermistor, in view of its temperature coefficient. The NTC thermistor is a material which has a negative temperature coefficient and whose resistivity decreases with increasing temperature, and is applied in the form of a temperature sensor to temperature compensation elements, etc. The PTC thermistor is on the other hand a material which has a positive temperature coefficient and whose resistivity increases sharply at a certain specific temperature. Taking this property, the PTC thermistor is widely applied to temperature control elements, overcurrent control elements, motor-starting elements, constant-temperature heat generators, etc.

A $BaTiO_3$ base ceramic material is typical of such PTC thermistors. $BaTiO_3$ is a ferroelectric material having a perovskite structure whose PTCR (positive temperature coefficient of resistivity) property becomes available at a temperature higher than its Curie temperature (Tc).

In this case, it is believed that the PTCR property becomes available through a potential barrier at a grain boundary. That is, excessive oxygen or impurities present on the surface of a crystal grain form an interface acceptor level, whereby an electron is captured from the crystal to form a depletion layer. At the grain boundary a Schottky potential barrier is formed. A high resistivity at a temperature higher than Tc is believed to be ascribed to this barrier. At temperatures less than Tc, on the other hand, spontaneous polarization causes a negative charge to be present at the grain boundary with a probability of 50%, so that the acceptor can be compensated for, resulting in a lowering of the barrier height. This is believed to contribute to a resistivity drop. At temperatures higher than Tc, the barrier height goes back to the original one due to the vanishing of spontaneous polarization. This is presumed to contribute to a resistivity rise.

In addition to $BaTiO_3$ base ceramics, $PbTiO_3$—$TiO_2$ base ceramics, too, are known as materials showing the PTCR property. A point common to these materials exhibiting the PTCR property is that they are ferroelectrics having a perovskite structure. It is further pointed out that important for these ferroelectrics is to make them semiconductive by a valence control method.

In JP-A 6-163204, the inventors have already proposed to obtain a semiconductive bismuth laminar oxide having the composition $Bi_4Ti_3O_{12}$, with a part of Ti replaced by Nb, from bismuth laminar oxides which have a pseudo-perovskite type of subordinate lattices and most of which are ferroelectrics, and replacing a part of Bi in the obtained oxide by Sr, thereby imparting the PTCR property thereto. This bismuth laminar oxide is a good PTC thermistor material that can show the PTCR property and a sharp resistance change at temperatures exceeding 200° C. In JP-A 6-283308, the inventors have also come up with a PTC thermistor material comprising a $Bi_2O_3$—$TiO_2$ base composite oxide containing bismuth oxide and titanium oxide wherein a part of the titanium oxide has been replaced by at least one oxide selected from niobium oxide, tantalum oxide and antimony oxide and a part of the bismuth oxide has been replaced by at least one oxide selected from strontium oxide, calcium oxide and barium oxide.

A problem with these PTC thermistor materials is, however, that neither can the temperature at which the PTCR property becomes available be arbitrarily changed nor can the rate of resistivity change be arbitrarily controlled.

With the aforesaid PTC thermistor materials comprising composite oxides containing Bi and Ti, it is difficult to reduce their resistivity at a temperature lower than the temperature at which the PTCR property becomes available because the ceramics become semiconductive. When a PTC thermistor material is applied to a circuit part through which large currents pass in a normal state rather than in an overheated state, it is required to have a decreased resistivity at a temperature lower than the temperature at which the PTC property becomes available. However, a conventional semiconductive ceramic material can hardly be applied to such application. When it is somehow applied to such a circuit part, it is unavoidable that the size of the circuit part becomes excessively large.

In view of such situations as mentioned above, the inventors filed Japanese Patent Application No. 160746/1996 to come up with a PTC thermistor material having a structure wherein metal phases containing Bi as a main component are dispersed in an $SrBi_4Ti_4O_{15}$ type phase. One great advantage of this PTC thermistor material is that it is possible to vary the melting point of the metal phases thereby controlling the temperature at which the PTCR property becomes available, because the availability of the PTCR property is determined by the melting of the metal phases. The electrical conductivity of the material at a temperature lower than the temperature at which the PTCR property becomes available is dependent on the size of the metal phases, the space factor of the metal phases in the material, etc.; that is, another advantage of the material is that its normal-temperature resistivity can be made lower than that of a conventional material by controlling such conditions. Thus, this PTC thermistor material can be applied to a circuit part through which large currents pass in a normal operation state.

For the fabrication of this PTC thermistor material, however, a firing atmosphere must be placed under relatively strict control, because it is required to precipitate metal phases from a matrix ceramic phase by firing in a reducing atmosphere. This, in turn, makes low-cost PTC thermistor material production difficult, and renders it difficult to mass produce PTC thermistor materials having stable properties. Further, the precipitation of the metal phases by reduction causes the metal phases to be substantially present only in the vicinity of the surface of the material. It is thus impossible to increase the ratio of the sectional area of a conducting path with respect to the sectional area of the material. In other words, when the material is designed as an element operated with an increased rated current, there is no choice all but to increase element size. Furthermore, since the zone of the PTC thermistor material where it can play its own role is restricted to the vicinity of the surface of the material, it is required to construct the material in the form of a sheet having a large specific surface area to decrease its volume. Such a limited degree of shape freedom imposes some considerable limitation on designing the material as an element.

DISCLOSURE OF THE INVENTION

An object of the invention is to provide a PTC thermistor material which can be controlled in terms of various properties such as the temperature at which the PTCR property becomes available and the rate of resistivity change, can be applied to circuit parts through which large currents pass in a normal operation state, can be easily manufactured, can keep the PTCR property stable, can use an increased rated current albeit being of small size, and can have an increased degree of shape freedom.

According to the invention, such an object is achieved by the provision of:

(1) A PTC thermistor material comprising a matrix phase and electrically conductive phases substantially uniformly dispersed in said matrix phase, said conductive phases having a resistivity lower than that of said matrix phase, so that a resistivity of said PTC thermistor material can change sharply in the vicinity of a melting point of said conductive phases.

(2) The PTC thermistor material according to (1), wherein said matrix phase is made up of any one of a polycrystalline ceramic material, a glass-polycrystalline ceramic composite material, a glass, a crystallized glass, and a polymer material, and said conductive phases are made up of a metal containing bismuth as a main component.

EFFECTS AND ADVANTAGES OF THE INVENTION

The PTC thermistor material of the invention has a structure wherein phases of a metal or like material having a low resistivity are substantially uniformly dispersed in a matrix phase made up of a ceramic material or like material having a high resistivity.

The PTC property of this material is ascribed to the changeover of one main conducting path to another based on the melting of the conductive phases. The present invention will now be explained with reference to a PTC thermistor material wherein the conductive phases are made up of a metal containing bismuth or Bi as a main component and the matrix phase is made up of a ceramic material.

At temperatures less than the melting point of the conductive phases, the conductive phases having a resistivity lower than that of the matrix phase provide a main conducting path, and so the overall resistivity of the material becomes relatively low. At temperatures higher than the melting point of the conductive phases, the conductive phases melt. In this case, however, the conductive phases made up of the metal containing Bi as a main component makes a coarse electrical connection with the matrix phase due to its volumetric shrinkage upon melting. For this reason, the matrix phase constitutes a main conducting path, so that the material can show a striking resistivity increase upon heated to the melting point of the conductive phases. In the practice of the invention, it is preferable to use conductive phases susceptible to a volumetric shrinkage upon melting. However, it is also acceptable to use any conductive phases that can effect the changeover of one main conducting path over to another main conducting path when dispersed in the matrix phase and melted therein.

In the PTC thermistor material of the invention, the PTCR property becomes available through such action as mentioned above. It is thus possible to achieve the desired PTCR property by an appropriate combination of materials forming the conductive and matrix phases. More illustratively, the melting point of the conductive phases can be varied by varying the material forming the conductive phases, e.g., the composition of a Bi alloy, whereby the temperature at which the PTCR property becomes available can be controlled. The rate of resistivity change of the material, too, can be controlled by varying the resistivity of the matrix phase. When the matrix phase is made up of an $SrBi_4Ti_4O_{15}$ type phase as set forth in the aforesaid JP-A 8-160746, the NTCR property resulting from the matrix phase becomes available on a higher temperature side. According to the invention, however, it is possible to prevent any shift of the NTCR property to the higher temperature side because the matrix phase-forming material can be selected from various materials. This is explained typically with reference to a PTC thermistor element used as a constant-temperature heat generator. Upon the element temperature shifted to a higher temperature side, the resistivity increases with a current decrease, resulting in an element temperature drop. Upon the element temperature shifted to a lower temperature side, on the other hand, the resistivity decreases with a current increase. As a result, the element temperature increases so that the element temperature can be maintained. If the NTCR property is obtained in a range of temperatures higher than the temperature at which the NTCR property becomes available, however, the resistivity rather decreases with a further increase in the temperature within such a temperature range. This, in turn, makes switching operation difficult due to no element temperature drop.

In the PTC thermistor material of the invention, the PTCR property becomes available through the melting of the conductive phases. For this reason, the resistivity increases sharply or very quickly in response to a temperature increase.

Unlike the aforesaid process of precipitating metal phases by reduction firing, the present invention can make an independent selection of the raw materials for the matrix and conductive phases. According to the present invention, the PTC thermistor material is usually manufactured through a step of mixing the raw material for the matrix phase with the raw material for the conductive phases. It is thus possible to make a free selection of the resistivity, size and dispersion density of the conductive phases, the space factor of the conductive phases in the material, etc. This can in turn bring the resistivity of the PTC thermistor material at temperatures less than the melting point of the conductive phases down to, for instance, $1\times10^0$ $\Omega$m or lower and especially $1\times10^{-1}$ $\Omega$m or lower. Accordingly, the PTC thermistor material of the invention can be applied to a circuit part through which large currents pass in a normal operation state, so that the size of the circuit part can be reduced. The present invention can also make an independent selection of the resistivity of the conductive phases and the resistivity of the matrix phase, and so enables the rate of resistivity change to be easily increased in association with the PTC property. Specifically, the rate of resistivity change can be easily regulated to usually $1\times10^2$ or more or $1\times10^4$ or more, and often $1\times10^6$ or more. Further, the present invention is different from the aforesaid process of precipitating conductive phases by reduction firing in that the substantially uniform dispersion of the conductive phases 35 in the matrix phase can be achieved with no local distribution of the conductive phases. Accordingly, the PTC thermistor material of the invention can be formed into an element operated with an increased rated current because the ratio of the sectional area of the conducting path with respect to the sectional area of the material can be increased. Furthermore, the PTC thermistor material of the invention can be formed into any desired shape conforming to equipment on which it is to be mounted because it can overall serve as a PTC thermistor with an increased degree of shape freedom.

The PTC thermistor material of the invention may be manufactured by firing in the air. The firing-in-the-air makes firing condition control easy, and so enables materials having stable properties to be manufactured at low costs.

BEST MODE FOR CARRYING OUT THE INVENTION

The PTC thermistor material of the invention comprises a matrix phase and conductive phases substantially uniformly dispersed in the matrix phase, said conductive phases having a resistivity lower than that of said matrix phase, and has the PTCR property that the resistivity of the material changes sharply in the vicinity of the melting point of said conductive phases.

Conductive Phase Constituting Material

For the conductive phase-constituting material it is acceptable to use a material that has a resistivity lower than that of the matrix phase-constituting material at temperatures less than the melting point thereof, and provides a main conducting path in a state upon dispersed in the matrix phase, with said main conducting path changing over to that defined by the matrix phase upon melting in that state.

The conductive phase-constituting material itself is not required to change in terms of resistivity upon melting; that is, its resistivity may increase or decrease upon melting. Since, as already stated, the resistivity of the PTC thermistor material at temperatures less than the melting point of the conductive phase-constituting material is not dependent on the resistivity of the conductive phases alone, the resistivity of the conductive phase-constituting material itself is not critical. In the practice of the invention. however, a resistivity of $1\times10^{-4}$ Ωm or lower is usually preferred.

The melting point of the conductive phase-constituting material may have an appropriate value depending on the temperature at which the required PTCR property becomes available although a melting point of room temperature to about 1,200° C. and especially 50 to 700° C. is generally preferred.

Preferred examples of the conductive phase-constituting material are metals containing bismuth or Bi as a main component, viz., bismuth, and bismuth alloys. When the metal containing Bi as a main component is used, the PTCR property becomes available via shrinkage upon melting, as already stated. Preferred bismuth alloys contain in addition to bismuth at least one metal element selected from indium or In, gallium or Ga, silver or Ag, lead or Pb, copper or Cu, antimony or Sb, arsenic or As, and germanium or Ge. The bismuth alloys have a Bi content of preferably at least 40 at % and more preferably at least 80 at %. Referring here to a bismuth alloy in general, the rate of shrinkage upon melting decreases with a decrease in the bismuth content; the smaller the bismuth content, the smaller the rate of resistivity change becomes.

For the conductive phase-constituting material it is also acceptable to use Sb, Ga, and Ge alone or in an alloy form. These, too, shrink upon melting as in the case of Bi.

Matrix Phase Constituting Material

For the matrix phase-constituting material that is not critical in the practice of the invention, it is preferable to use a material that has a resistivity higher than that of the conductive phase-constituting material, and provides a main conducting path upon the melting of the conductive phases dispersed in the matrix phase. Since the resistivity of the PTC thermistor material at temperatures higher than the melting point of the conductive phase-constituting material is dependent not only on the resistivity of the matrix phase but on the structure of the conductive phases as well, the resistivity of the matrix phase-constituting material itself is not critical although a resistivity of $1\times10^3$ Ωm or more is preferred. When this resistivity is too low, it is difficult to obtain the good PTCR property.

Such materials include polycrystalline ceramics, glass-polycrystalline ceramic composite materials, glasses, crystallized glasses, and polymer materials, with the polycrystalline ceramics being particularly preferred.

For the polycrystalline ceramics used for the matrix phase, a composite oxide containing Bi, titanium or Ti and strontium or Sr as set forth in Japanese Patent Application No. 160746/1996 is preferred. In the practice of the invention, however, Sr may be dispensed with. The specification alleges that it is preferable to add at least one element of niobium or Nb, tantalum or Ta and antimony or Sb, especially Nb to the composite oxide to make it semiconductive, so that the PTCR property can become available. However, such a semiconductive element(s) may be dispensed with in the practice of the invention. That is, a composite oxide containing at least Bi and Ti as main components can preferably be used in the practice of the invention. In this regard, note that Nb or the like may be added to the composite oxide because it serves as a sintering aid.

It is usually preferred that the composite oxide containing Bi and Ti as main components, used in the invention, has a major composition $Bi_4Ti_3O_{12}$. More preferably, the composite oxide has a composition (atomic ratio) represented by Here A is at least one element selected from Sr, calcium or Ca and barium or Ba, and B is at least one element selected from Nb, Ta and Sb.

In the above formula, the preferred ranges for letters a, b and x are $0 \leq a \leq 0.2$ $0 \leq b \leq 0.1$ $0.5 \leq x \leq 2$ Letter y stands for a value that is determined depending on the proportion of each element and is usually in the vicinity of the stoichiometric composition. If, in the above formula, a, b and x are within the ranges defined above, the matrix phase has a generally preferable resistivity.

When the matrix phase is made up of the composite oxide containing Bi and Ti as main components, no particular limitation is imposed on crystal phases present therein. For instance, at least one phase selected from an $SrBi_4Ti_4O_{15}$ type phase (bismuth laminar structure), a $Bi_2Ti_4O_{11}$ type phase (monoclinic structure), a $Bi_4Ti_3O_{12}$ type phase (bismuth laminar structure) and a $Bi_2Ti_2O_7$ type phase (pyrochlore structure) is usually present in the matrix phase. To add to this, at least one phase selected from a $TiO_2$ type phase (usually a rutile structure) and an $SrTiO_3$ type phase (perovskite structure) may be present in the matrix phase.

Many other polycrystalline ceramics may also be used, inclusive of various oxides such as titania ($TiO_2$), alumina ($Al_2O_3$), silica ($SiO_2$), magnesia (MgO), tin oxide ($SnO_2$), nickel oxide (NiO), zinc oxide (ZnO), chromium oxide ($Cr_2O_3$), cobalt oxide (CoO or $CO_3O_4$), iron oxide (FeO, $Fe_2O_3$ or $Fe_3O_4$), tantalum oxide ($Ta_2O_5$), niobium oxide ($Nb_2O_5$), zirconia ($ZrO_2$), hafnia ($HfO_2$), vanadium oxide ($V_2O_3$, $V_2O_5$, etc.), beryllia (BeO), molybdenum oxide ($MoO_3$), tungsten oxide ($WO_3$), and thoria ($ThO_2$); various carbides such as silicon carbide (SiC) and boron carbide ($B_4C$); various nitrides such as aluminum nitride (AlN), boron nitride (BN) and silicon nitride ($Si_3N_4$). In addition, use may be made of titanates such as barium titanate ($BaTiO_3$), lead titanate ($PbTiO_3$), PZT and PLZT; various ferrites such as soft magnetic ferrites and hard magnetic ferrites; silicates and aluminates such as calcium silicate ($CaSiO_3$ or $Ca_2SiO_4$), cordierite ($Mg_2Al_4Si_5O_{18}$), lithium aluminosilicate ($LiAlSi_2O_6$), zeolite and mullite ($3Al_2O_3.2SiO_2$); stabilized zirconia; tungsten bronze; molybdenum bronze; and sialon (SiAlON).

It is here to be noted that the titanium oxide may have either a rutile structure or an anatase structure although the titanium oxide having an anatase structure is preferable because of ease of sintering.

The glass-polycrystalline ceramic composite materials usable herein include combinations of such polycrystalline ceramics as mentioned above with various glasses, for instance, a glass-alumina composite material used for low-temperature firing substrates, etc.

When the matrix phase is composed only of a glass material, it is preferable that the raw powders of glass having a melting point of the order of 500 to 2,500° C. and a glass transition point of the order of 350 to 1,500° C. are mixed and fired with the raw material powders for the conductive phases. In this case, firing is preferably carried out at a temperature higher than the glass transition point of the glass but less than the melting point thereof. The glass transition point of the glass must be higher than the melting point of the conductive phases. For instance, it is preferable to use oxide base glasses such as quartz glass, Pyrex glass, titania-containing glass and zirconia-containing glass, $As_2S_3$ base chalcogenide glasses, and $ZrF_4$ base fluoride glasses.

The polymer materials used herein, for instance, include general-purpose resins such as polyethylene, polypropylene, polystyrene and polyvinyl chloride, and polymer base composite materials such as various engineering resins, heat-resistant resins, polymer alloys and fiber-reinforced resins.

The softening point of the polymer material used herein must be higher than the melting point of the conductive phases. To fabricate the PTC thermistor material from the polymer material, a powdery form of polymer material is first mixed with the raw material powders for the conductive phases. Then, the mixture may be heated and/or pressed. For instance, the mixture may be pressed, heated upon pressing, or pressed while heated. In this regard, note that heating is preferably carried out at a temperature less than the glass transition point of the polymer material.

When the matrix phase is made up of a polycrystalline ceramic material, the matrix phase has preferably an average grain diameter of the order of 0.02 to 20 $\mu$m. The crystal grains of the matrix phase may be identified by means of a scanning electron microscope.

Material Structure

The PTC thermistor material of the invention has a structure in which the conductive phases are substantially uniformly dispersed in the matrix phase.

The average spacing between the conductive phases, as measured in sections through the PTC thermistor material, is not critical; it may be properly determined depending on the materials constituting the conductive and matrix phases, and various requirements such as the required PTCR property. For instance, when the metal containing Bi as a main component is used for the conductive phases and the polycrystalline ceramic material or glass-polycrystalline ceramic composite material is used for the matrix phase, it is usually referable that the average spacing is of the order of 1 to 100 $\mu$m. When the average spacing is too narrow, the good PTCR property can hardly be obtained, because the material behaves generally like a metal. When the average spacing is too wide, on the other hand, the good PTCR property can again hardly be obtained, because the material behaves generally like ceramics. In addition, it is difficult to use the material as a circuit part because the resistivity of the material becomes high at low temperatures.

The average grain diameter of the conductive phases, as measured in sections through the PTC thermistor material, too, varies depending on such requirements as mentioned above, and so may be properly determined as the occasion may demand. For instance, when the metal containing Bi as a main component is used for the conductive phases and the polycrystalline ceramic material or glass-polycrystalline ceramic composite material is used for the matrix phase, it is usually preferable that the average grain diameter is of the order of 1 to 100 $\mu$m. When the average grain diameter is too small, the good PTCR property can hardly be obtained, because the material behaves generally like ceramics. In addition, it is difficult to use the material as a circuit part because the resistivity of the material becomes high at low temperatures. When the average grain diameter is too large, on the other hand, the good PTCR property can again hardly be obtained, because the material behaves generally like a metal.

The proportion of the conductive phases in the PTC thermistor material, too, varies depending on such requirements as mentioned above, and so may be properly determined as the occasion may demand. For instance, when the metal containing Bi as a main component is used for the conductive phases and the polycrystalline ceramic material or glass-polycrystalline ceramic composite material is used for the matrix phase, it is usually preferable that the proportion of the conductive phases in the material is of the order of 10 to 30% by volume. When the conductive phases are too little, the good PTCR property can hardly be obtained, because the material behaves generally like ceramics. In addition, it is difficult to use the material as a circuit part because the resistivity of the material becomes high at low temperatures. When the conductive phases are too much, on the other hand, the good PTCR property can again hardly be obtained, because the material behaves generally like a metal. In this regard, note that the volume proportion of the conductive phases in the material may be found from the area proportion of the conductive phases in a section through the material.

It is here to be understood that when a section through the PTC thermistor material of the invention is observed, most of the conductive phases are present in a discretely dispersed state. In some cases, however, there may be a three-dimensional conductive phase network structure that cannot be identified in section or by means of an optical microscope.

Fabrication Process

A preferred process of fabricating the PTC thermistor material of the invention will now be explained.

No particular limitation is placed on how to manufacture the PTC thermistor material of the invention. To provide substantially uniform dispersion of the conductive phases in the matrix phase, however, it is generally preferable to mix together the raw materials for the matrix and conductive phases, and form the mixture, if required, followed by heating. Set out below is an exemplary fabrication process.

When the metal containing Bi as a main component is used for the conductive phases and the composite oxide containing Bi and Ti as main components is used for the matrix phase, it is preferable to manufacture the PTC thermistor material of the invention by the following process.

For the raw material for the matrix phase, an oxide or a carbonate or hydroxide that is converted by firing into an oxide is usually used in a powdery form, and for the raw material for the conductive phase, the metal Bi or a Bi alloy is used.

Both the raw material powders may be mixed together in conventional manners. However, it is preferable to wet mill them in a ball mill, using a suitable solvent such as ethanol, water or hexane.

The mixture is then calcined, if required. The calcination is preferably carried out at a temperature of the order of 600 to 900° C. for a period of the order of 30 minutes to 5 hours in the air. The matrix phase can be more homogenized by the progress of the crystallization of the composite oxide, e.g., $SrBi_4Ti_4O_{15}$ at the calcination step. The calcined product is then pulverized preferably in a wet manner using a ball mill, etc., followed by drying.

Then, the mixed or calcined powders are formed under a pressure of the order of 50 to 200 MPa. Finally, the obtained compact is fired into a PTC thermistor material under the following firing conditions. Preferably, the heating rate is of the order of 50 to 500° C./hour and the cooling rate is of the order 50 to 500° C./hour. The firing temperature is preferably 900 to 1,300° C. and more preferably 1,075 to 1,175° C., and the firing time is preferably 30 minutes to 10 hours. The partial pressure of oxygen in the firing atmosphere is preferably predetermined such that no reduction of the matrix phase takes place. For an actual firing atmosphere varying depending on the composition of the matrix phase, a wide range of atmospheres from an argon or other inert atmosphere or an air or other oxidizing atmosphere can be used.

Even when other polycrystalline ceramic material such as titanium oxide are used for the matrix phase, it is possible to produce a PTC thermistor material by such a sintering process as referred to above.

When the matrix phase is made up of the glass-ceramic composite material, ceramic aggregates, glass powders and the raw material for the conductive phases may be mixed, formed, and fired.

When the matrix phase is made up of the glass, glass powders and the raw material for the conductive phases may be mixed, formed, and fired.

In the practice of the invention, such a process as mentioned below may also be utilized in addition to the process comprising the mixing of the raw material powders for the matrix phase with the raw material powders for the conductive phases. According to this process, the raw material films for the matrix phase and the raw material films for the conductive phases are alternately formed by a thick film technique such as coating or a thin film technique such as a vapor phase growth technique to obtain a multilayered structure. The multilayered structure is then fired. One raw material film for the conductive phases is contracted into grains by firing while the adjoining raw material film for the matrix phase is integrated therewith by sintering, whereby a sintered structure with the conductive phases substantially uniformly dispersed in the matrix phase can be obtained. In the practice of this process, the conditions of manufacture, e.g., film thickness and firing temperature may be properly determined depending on each raw material used, the required PTCR property, etc.

Besides these processes, hot pressing or the like may also be used in the practice of the invention.

The PTC thermistor material of the invention, for instance, is used for self-control type heat generators, demagnetizing elements for color TVs, motor starting elements, overcurrent limiting elements, etc.

EXAMPLE

The present invention will now be explained at great length with reference to some specific examples.

Example 1

Raw material powders of $Bi_2O_3$, $SrCO_3$, $TiO_2$ and $Nb_2O_5$, each with 99.9% purity, were weighed and mixed together in such a way that the ratio between the metal elements was the same as that of $SrBi_4(Ti_{0.95}Nb_{0.05})_4O_{15}$. The mixture was then calcined at 800° C. for 6 hours in the air. The calcined product was wet pulverized in ethyl alcohol to obtain the raw material for the matrix phase. Apart from this, powders of the metal Bi were prepared as the raw material for the conductive phases. Using ethyl alcohol, both the raw materials were wet mixed together at the following molar ratio:

Raw material for the matrix phase:Raw material for the conductive phases=25:75

The mixture was formed under pressure into a column of 10 mm in diameter and 10 mm in thickness. The forming pressure was 141 MPa. The obtained compact was fired for 2 hours in an argon atmosphere to obtain sintered sample A, and B. The firing temperature was 1,125° C. for sample A, and 1,100° C. for sample B.

Measurement of Temperature Property of Resistivity

An In—Ga (40:60) electrode was provided on a polished surface of each sample in an ohmic contact relation thereto. Then, the sample was repeatedly subjected to a heating/cooling cycle in the air to measure a change in the voltage applied on the sample by means of a constant-current control method using a DC two-terminal method. The heating rate was 5° C./min., and the cooling rate was a furnace-cooling rate. With a current value of 100 mA/cm², the resistivity (ρ) was calculated by $$\rho = (E/I) \times (S/h)$$

Here E is an applied voltage, I is a current passing through the sample, S is a sectional area of the sample, and h is a thickness of the sample.

Figure 1:
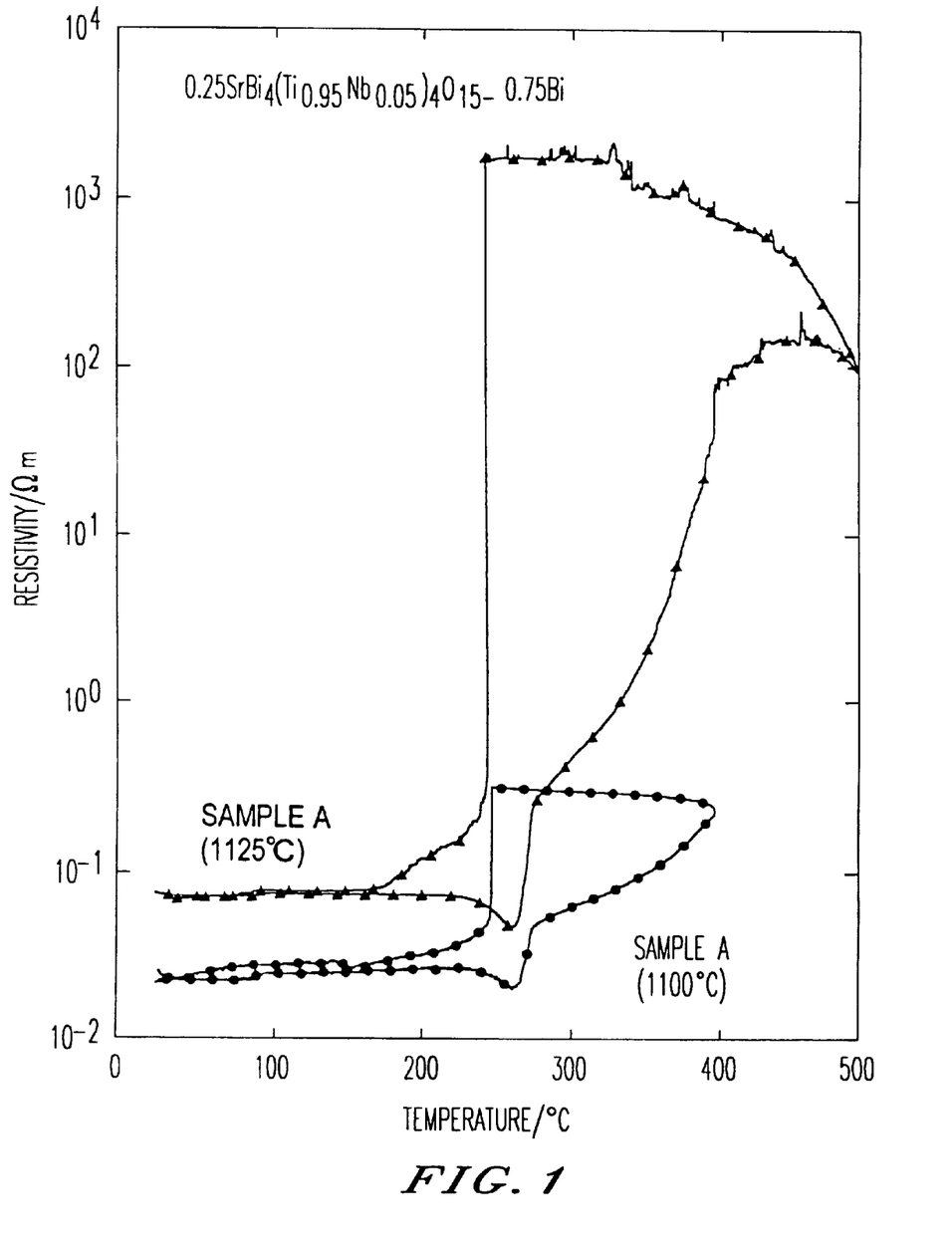
FIG. 1 is a resistivity vs. temperature graph for a sintered sample.

The measurement results are plotted in FIG. 1. In this regard, note that FIG. 1 shows the results of the third heating/cooling cycle for sample A, and the results of the fourth heating/cooling cycle for sample B.

From the resistivity vs. temperature graph of FIG. 1, it is found that both samples A and B have the PTCR property that, during heating, the resistivity increases sharply at about 270° C. substantially corresponding to the melting point of Bi. During cooling, the resistivity is found to decrease sharply at a temperature (about 250° C.) different from that during heating.

Sample A is found to have a very low resistivity of less than $1 \times 10^{-1}$ Ωm at temperatures from near room temperature to near the temperature at which the PTCR property becomes available, and show a very high rate of resistivity change of at least $1 \times 10^4$ due to the PTCR property. Sample B is found to be lower than sample A in terms of the rate of resistivity change, and much lower than sample A in terms of resistivity at temperatures from near room temperature to near the temperature at which the PTCR property becomes available.

In both samples, the resistivity at room temperature before heating is substantially equal to the resistivity at room temperature after cooling. This teaches that there is little or no property variation due to repeated heating/cooling cycles.

Next, the temperature property of resistivity of each sample was examined by a constant-voltage control method. An electric field of 10 mV/cm was applied on the sample to measure a current value change incidental to heating and cooling. The resistivity (ρ) was calculated from the above equation. As a result, it was found that each sample has the PTCR property and shows a rate of resistivity change of at least $1 \times 10^5$.

Material Structure

Figure 2:
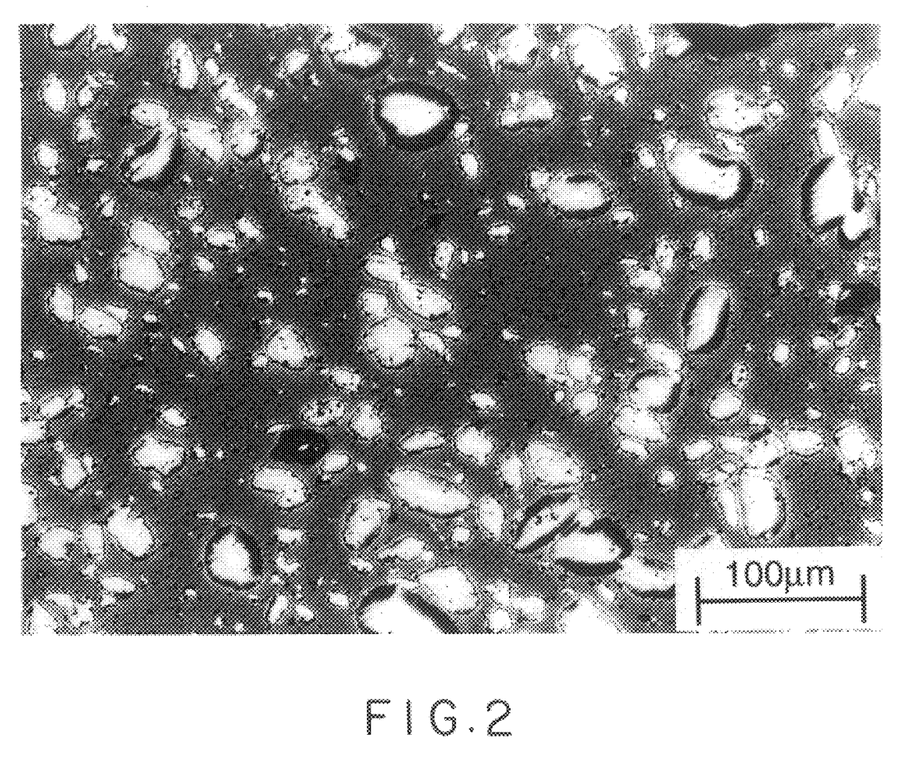
FIG. 2 is a crystal structure-showing substitute photograph for a drawing, i.e., an optical microphotograph showing a section through sample A.
Figure 3:
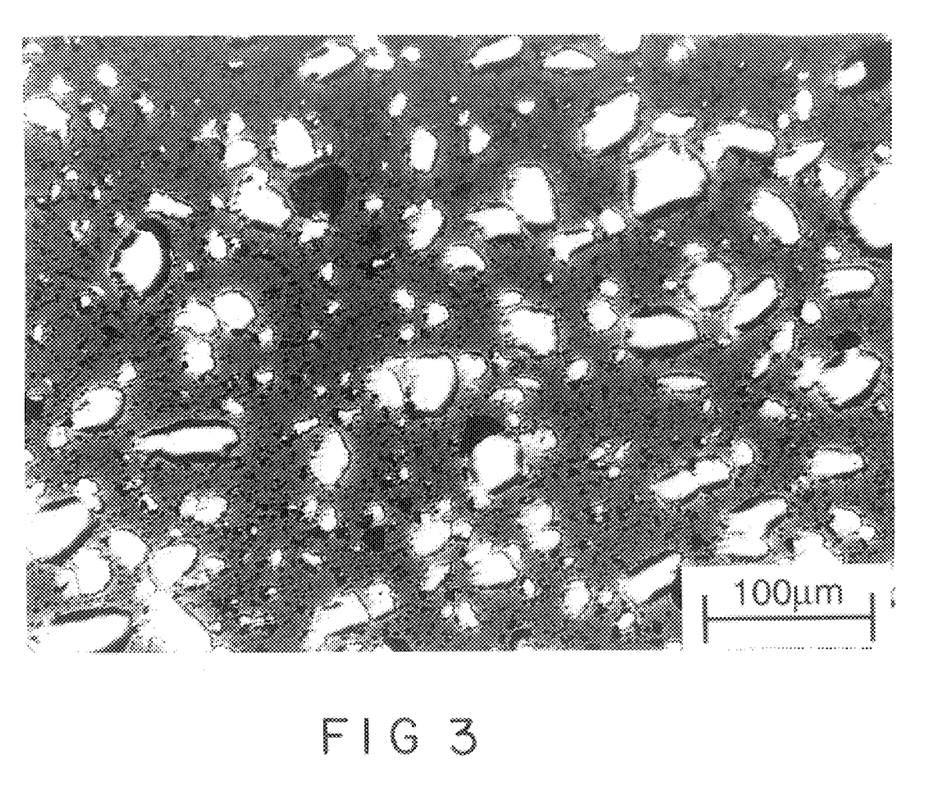
FIG. 3 is a crystal structure-showing substitute photograph for a drawing, i.e., an optical microphotograph showing a section through sample B.

The optical microphotographs of sections through the vicinity of middle portions of samples A and B are attached hereto as FIGS. 2 and 3, respectively. As can be seen from each microphotograph, bright spots are dispersed in a dark region. The results of EPMA and X-ray diffraction analyses indicate that the bright spots are Bi phases while the dark region is an $SrBi_4Ti_4O_{15}$ type phase.

In both samples A and B, the Bi phases in a substantially circular or oval form are in a discretely dispersed state. In a section through the material, the average grain diameter of the Bi phases are about 20 μm in both samples, the average spacing between the Bi phases is about 10 μm in both samples, and the space factor of the Bi phases is about 15% by volume in both samples. The average grain diameter of the matrix phase is about 1 μm in both samples.

Even when the firing atmosphere for obtaining the sintered samples was changed to air, the same results as mentioned above were obtained.

Example 2

Figure 4:
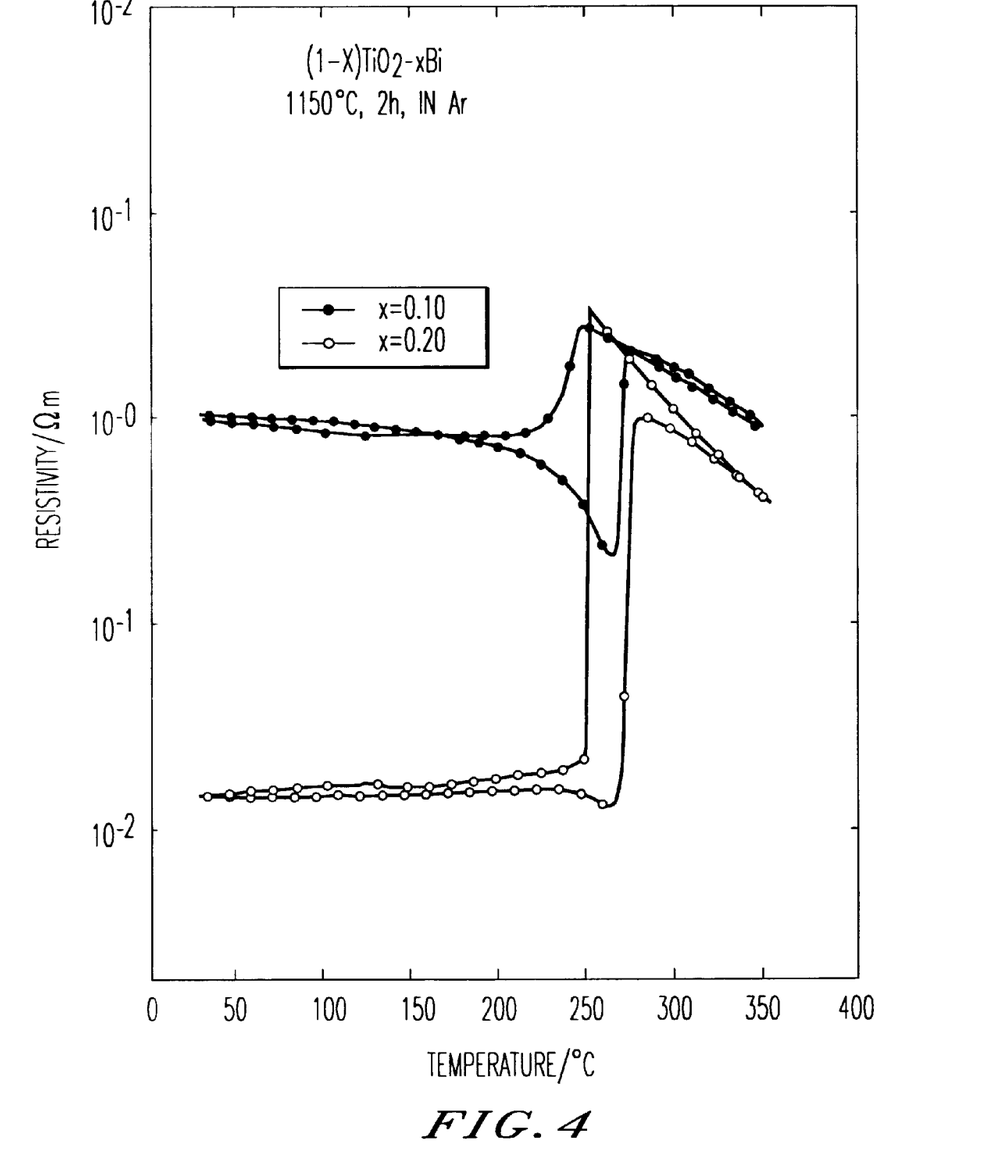
FIG. 4 is a resistivity vs. temperature graph for a sintered sample.

Powders of $TiO_2$ and the metal Bi were prepared as the raw materials for the matrix and conductive phases, respectively. Using ethyl alcohol, both the raw materials were wet mixed together in such a way that a composition (1-x)$TiO_2$—xBi was obtained. The values of the molar ratio represented by x are given in FIG. 4. Then, the mixture was formed under pressure into a column of 10 mm in diameter and 10 mm in thickness. The forming pressure was 141 MPa. The obtained compact was placed in an argon gas and fired at 1,150° C. for 2 hours to obtain sintered samples.

The temperature property of resistivity of each sample was measured using a constant-current control method as in Example 1. The results are plotted in FIG. 4. From FIG. 4, it is found that even when the matrix phase is made up of $TiO_2$, the good PTCR property is obtained.

Observation of a section through each sample under an optical microscope as in Example 1 indicates that the Bi phases are substantially evenly yet discretely dispersed in the matrix phase.

Example 3

Powders of $Al_2O_3$ and the metal Bi were prepared as the raw materials for the matrix and conductive phases, respectively. Using ethyl alcohol, both the raw materials were wet mixed together in such a way that the composition $0.60Al_2O_3$—$0.40Bi$ (molar ratio) was obtained. Then, the mixture was formed under pressure into a column of 10 mm in diameter and 10 mm in thickness. The forming pressure was 141 MPa. The obtained compact was placed in an argon gas and fired at 1,150° C. for 2 hours to obtain a sintered sample.

Figure 5:
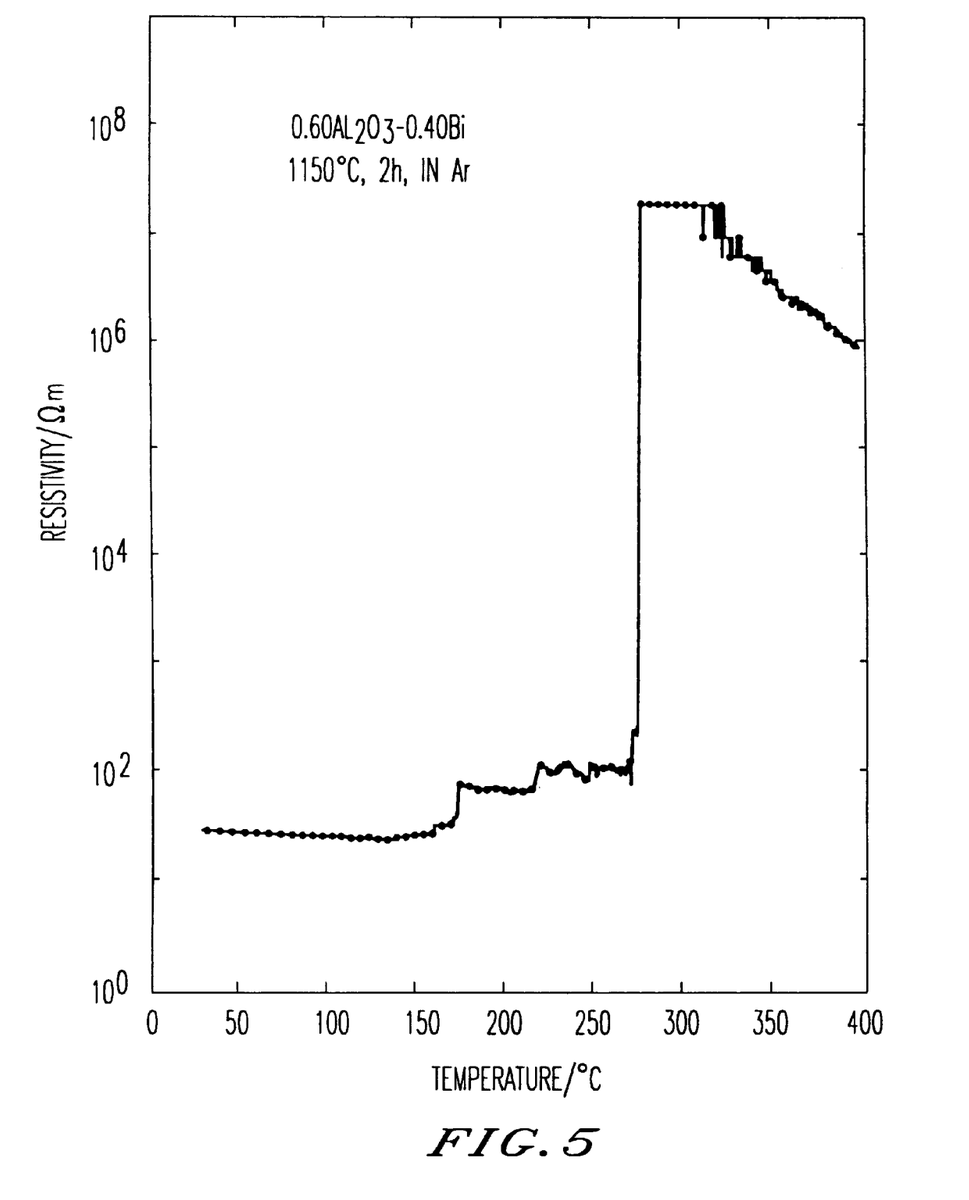
FIG. 5 is a resistivity vs. temperature graph for a sintered sample.

The temperature property of resistivity of the sample was measured at an applied voltage of 10 V/cm using a constant-voltage control method as in Example 1. The results are plotted in FIG. 5. From FIG. 5, it is found that even when the matrix phase is made up of $Al_2O_3$, the good PTCR property is obtained. It is also found that the rate of resistivity change becomes considerably high especially because of the high resistivity of $Al_2O_3$. In FIG. 5, note that the resistivity shows a constant value in the vicinity of 270 to 300° C. This is because the value of a measuring current fell below the sensitivity of an ampere meter, and so could not be measured.

Observation of a section through the sample under an optical microscope as in Example 1 indicates that the Bi phases are substantially evenly yet discretely dispersed in the matrix phase.

What we claims is:

1. A PTC thermistor material comprising
   (A) a matrix phase; and
   (B) electrically conductive phase uniformly dispersed in said matrix phase,
   wherein said conductive phase has a resistivity lower than that of said matrix phase;
   wherein a resistivity of said PTC thermistor material changes sharply at the melting point of said conductive phases; and
   wherein said conductive phase is comprises of metal bismuth or a metal bismuth alloy; and
   wherein said melting point is in the range of from 50 to 1,200° C.;
   wherein said bismuth alloy comprises bismuth and at least one additional metal selected from the group consisting of indium, gallium, silver, lead, copper, antimony, arsenic and germanium.

2. The PTC thermistor material of claim 1, wherein said bismuth alloy comprises bismuth in an amount of at least 40 wt %.

3. The PTC thermistor material of claim 1, wherein the resistivity of said conductive phase is up to $1 \times 10^{-4}$ Ωm and the resistivity of said matrix phase is more than $1 \times 10^3$ Ωm.

4. The PTC thermistor material of claim 1, wherein said matrix phase comprises an oxide comprising bismuth and titanium.

5. The PTC thermistor material of claim 4, wherein said oxide has the formula:

$$Bi_4Ti_3O_{12}.$$

6. The PTC thermistor material of claim 4, wherein said oxide has the formula:

$$(Bi_{1-a}A_a)(Ti_{1-b}B_b)_xO_y$$

where A is at least one element selected from the group consisting of Sr, Ca and Ba; B is at least one element selected from the group consisting of Nb, Ta and Sb; and where $0 \leq a \leq 0.2$; $0 \leq b \leq 0.1$; and $0.5 \leq x \leq 2$.

7. The PTC thermistor material of claim 1, wherein said resistivity changes at a rate of at least $1 \times 10^2$.

8. The PTC thermistor material of claim 1, wherein the average grain diameter of the conductive phase is between 1 and 100 $\mu$m.

9. The PTC thermistor material of claim 1, wherein the average spacing between conductive phases is between 1 to 100 $\mu$m.

* * * * *